United States Patent [19]
Torikoshi

[11] Patent Number: 5,643,685
[45] Date of Patent: Jul. 1, 1997

[54] THIN FILM ELECTROLUMINESCENCE ELEMENT AND PROCESS FOR PRODUCING THE SAME

[75] Inventor: Kaoru Torikoshi, Minami Ashigara, Japan

[73] Assignee: Fuji Xerox Co., Ltd., Tokyo, Japan

[21] Appl. No.: 325,568

[22] Filed: Oct. 19, 1994

[30] Foreign Application Priority Data

Oct. 26, 1993 [JP] Japan ................... 5-266859

[51] Int. Cl.$^6$ .................. H05B 33/00; B32B 9/00
[52] U.S. Cl. ............... 428/690; 428/917; 313/503; 313/509; 427/66
[58] Field of Search ................... 428/690, 917; 313/503, 509; 427/66

[56] References Cited

U.S. PATENT DOCUMENTS 4,882,517  11/1989  Maruyama et al. ................ 313/502

FOREIGN PATENT DOCUMENTS

| 64-67894 | 3/1989 | Japan . |
| 1-213990 | 8/1989 | Japan . |
| 2-297894 | 12/1990 | Japan . |
| 3-280394 | 12/1991 | Japan . |

*Primary Examiner*—Charles Nold
*Attorney, Agent, or Firm*—Oliff & Berridge

[57] ABSTRACT

An electroluminescence element composed of a substrate, a first electrode, a first insulating layer, a light-emitting layer, a second insulating layer, and a second electrode in this order and a process for producing the same are disclosed, in which the light-emitting layer comprises a chemically stable oxide material containing a plurality of elements, the composition ratio of the elements constituting said oxide material being substantially equal to that of the elements charged, the light-emitting layer is formed by coating a first insulating layer with a sol solution containing a plurality of metal elements at a prescribed composition ratio and heating the coating layer to form an oxide layer.

7 Claims, 1 Drawing Sheet

THIN FILM ELECTROLUMINESCENCE ELEMENT AND PROCESS FOR PRODUCING THE SAME

FIELD OF THE INVENTION

This invention relates to a thin film electro-luminescence element and a process for producing the same.

BACKGROUND OF THE INVENTION

A thin film electroluminescence (hereinafter abbreviated as TFEL) element is a totally solid light-emitting element and is widely used as a display of a personal computer or a workstation taking advantage of its excellent visibility and high speed of displaying as well as the characteristics as a flat panel display in weight and thickness. A TFEL element typically has the structure shown in FIG. 1, called a double insulating layer structure. In more detail, a transparent conducting film comprising a solid solution of $SnO_2$ and $In_2O_3$ (ITO), ZnO:Al, etc. is laminated on transparent substrate 1, such as a glass substrate, and processed by photolithography and etching to form light-transmitting electrode 3 in stripes. Insulating layer 5 comprising $SiO_2$, $Y_2O_3$, $Al_2O_3$, $Ta_2O_5$, $Si_3N_4$, or a combination thereof is formed thereon by electron beam deposition, sputtering, etc. On insulating layer 5 is formed light-emitting layer 7 comprising a sulfide, e.g., ZnS, CaS or SrS, as a matrix activated with an adequate amount of a rare earth element or a transition element as a luminescence center by electron beam deposition, sputtering or chemical vapor deposition (CVD). Insulating layer 9 similar to insulating layer 5 is further formed on light-emitting layer 7, and electrode 11 comprising Al, Au, ITO, etc. is provided on insulating layer 9 in direction perpendicular to electrode 3. Electroluminescence (EL) occurs on applying an alternating voltage between crossing electrodes 3 and 11.

Conventional EL elements use a sulfide phosphor exemplified by ZnS as a material of a light-emitting layer. However, since a sulfide is instable against humidity and oxidation, a passivation for protecting an EL element against the outside is required. It is also pointed out that the light-emitting layer is gradually oxidized by the oxide used as an insulating layer to reduce the working life of the EL element.

On the other hand, oxide phosphors have been put to practical use in cathode ray tubes, plasma displays, fluorescent display tubes, and fluorescent tubes. Oxide phosphors are chemically more stable than sulfide phosphors and generally have relatively high resistance to moisture. A number of oxide phosphorus have been proposed to date.

Precedent patents relating use of an oxide phosphor in the light-emitting layer of a TFEL element include JP-A-63-232295, the term "JP-A" as used herein means an "unexamined published Japanese patent application") concerning an MIM structure (metal/oxide/oxide phosphor/metal) in which a light-emitting layer of an oxide phosphor is formed by sputtering to obtain emission of red light, green light or blue light; JP-A-64-67894 in which a fluorescent substance for a cathode ray tube which emits white light is prepared by electron beam deposition or radiofrequency sputtering, and a filter is provided for obtaining a color display; JP-A-1-213990 in which $Ta_2O_5$ is formed by electron beam deposition, and luminescence from the traps due to oxygen defect is utilized for blue light emission, JP-A-2-297894 in which an alkaline earth metal oxide activated with a rare earth element is combined with an oxide insulating layer in an attempt to reduce the driving voltage, and JP-A-3-280394 in which a chain ion of $CaWO_4$, etc. is used as a light-emitting layer.

However, many of the TFEL elements using an oxide in the light-emitting layer are considerably inferior in luminance to those using a sulfide. The reason seems to reside in difficulty in preparing a thin film of a highly crystalline oxide satisfying a stoichiometric composition ratio because many oxide phosphors have a complicated chemical composition ratio. Further, electron beam deposition and sputtering involve problems of cost and performance. That is, the resulting thin film tends to suffer from composition change due to deterioration of the target itself or defects due to scattering of clusters during thin film formation; large-sized apparatus is required because of involvement of a vacuum system; and preparation of an EL element of wide area is difficult.

Conventional AC-driven TFEL elements generally need high voltage for driving, requiring an expensive, high-pressure-resistant drive IC. It has therefore been demanded to establish a technique for reducing the driving voltage.

SUMMARY OF THE INVENTION

The present invention has been completed for the purpose of solving the above-described problems associated with the conventional TFEL elements.

The present invention relates to an EL element composed of a substrate, a first electrode, a first insulating layer, a light-emitting layer, a second insulating layer, and a second electrode in this order, in which the light-emitting layer comprises an oxide material containing a plurality of elements which is obtained by coating a solution of organic metal compounds containing an element acting as a luminescence center and heating, the composition ratio of the elements constituting the oxide material being substantially equal to that of the elements charged.

The present invention also relates to a process for producing an EL element having the above-mentioned structure, which comprises the step of dissolving a compound of an element acting as a luminescence center and one or more of organic metal compounds having different metallic elements in a solvent to prepare a hydrolyzable sol solution having a prescribed composition ratio of the metallic elements, the step of applying the sol solution to a first insulating layer of a substrate having formed thereon a first electrode and a first insulating layer in this order to form a coating layer, the step of heating the coating layer to form an oxide film of a light-emitting layer having a composition ratio of metallic elements substantially equal to that of the sol solution, and the step of successively forming a second insulating layer and a second electrode on the oxide film.

DETAILED DESCRIPTION OF THE INVENTION

Figure 1:
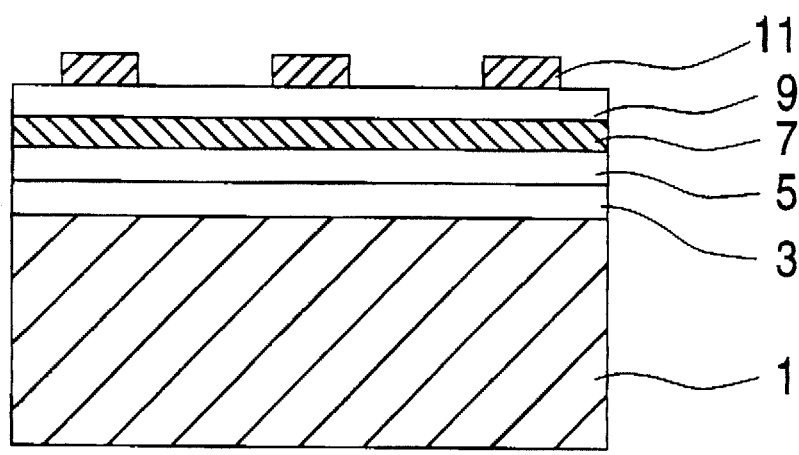
FIG. 1 illustrates a schematic structure of a TFEL element.

The EL element of the present invention is chemically stable owing to the use of a chemically stable oxide material which is obtained by coating a solution of organic metal compounds containing an element acting as a luminescence center and heating, as a light-emitting layer. The organic metal compounds containing an element acting as a luminescence center comprises an organic metal compound of an element acting as a luminescence center and one or more of organic metal compounds having different metallic elements.

The organic metal compounds disclosed above which produce metal oxide material as a light-emitting layer are dissolved in a solvent to form a paste composition, coated on a substrate and thermally decomposed to form a light-emitting layer. Because the method is a wet process, the process of the present invention makes it possible to form a light-emitting layer over a large area without involving change in composition. Since all the layers, i.e., first and second electrodes, first and second insulating layers, and a light-emitting layer can be formed by the same process simply by changing the materials, not only are achieved high performance properties but is greatly reduced the cost of production.

The oxide material as a light-emitting layer can be produced in oxide formation by a sol-gel method. For example, a metal alkoxide doped with an organic metal compound serving as a luminescence center is applied to a substrate and hydrolyzed and crystallized by heating to form a thin light-emitting film comprising an activated oxide material. Similarly, a sol-gel method can be applied to formation of electrodes and insulating layers.

The organic metal oxides to be used in the present invention can be purified to a high degree by common procedures for organic compounds, such as distillation, sublimation or crystallization, so that a paste or a sol solution having a controlled composition ratio can be prepared with ease as compared with a conventionally employed sputter target which is prepared by mixing inorganic powders, such as metal carbonates and metal oxalates, followed by calcination, grinding, and press molding. A sol solution having a controlled composition ratio provides a fluorescent film with little change in composition and thereby exhibiting high luminance.

In the present invention, it is required that a ratio of raw materials charged is controlled so as to be equal to that of prescribed composition ratio of elements composing the oxide material of the light-emitting layer. Thereby, each element composing the oxide material can be controlled with accuracy. For example, when oxide material in the light-emitting layer is prescribed to be $Zn_2SiO_4$, an organic compound containing Zn and an organic compound containing Si are mixed in a molar ratio of 2:1 to form a paste. In a case of Mn is prescribed to be luminescenece center element, an addition amount of an organic compound containing Mn is adjusted to be 1 mol % of Mn, when 1 mol % of Mn is prescribed to be contained in a light-emitting layer, although it is known that most effective emission is obtained when an addition amount of Mn is about 1 mol % in zinc silicate matrix.

The TFEL element according to the present invention may have a luminescent color of red, green or blue according to the fluorescent substance (oxide phosphor) constituting the light-emitting layer. It is possible to obtain a full-color display by laminating light-emitting layers of different luminescent colors or by forming light-emitting films of different luminescent colors in the form of dots or stripes and letting them emit either individually or in combinations. A full-color display may also be obtained by fitting a light-emitting layer emitting white light by itself with red, green and blue filters.

The process for producing an EL element according to the present invention basically consists of applying a paste or a sol solution containing at least one organic metal compound and decomposing the compound by heating and involves no such a step as grinding. The sol solution to be used may be modified by addition of additives, such as a thickener and a film-forming properties-improving agent, so as to be made suited to various methods of application, such as coating and printing. That is, a light-emitting layer can be formed through only three steps: preparation of a paste or a sol solution, application of the paste or the sol solution, and heating. By optimizing the additives and the heating conditions, a dense light-emitting layer with little variation in thickness or composition can be obtained.

The organic metal compounds which can be used for forming a light-emitting layer and an insulating layer are selected arbitrarily from known compounds. For example, useful organic metal compounds include metal alkoxides, metal octylates, metal naphthenates, and acetylacetonatometals.

The metal alkoxide used in the present invention preferably has a formula of $X_m$-M-$(OR)_n$, wherein R represents an alkyl group having 1 to 5 carbon atoms, X represent an organic group, M represents a metal selected from the group of Ia, IIa, IIIa, IIb, IVa, IVb, Va, Vb and VIII of the periodic table, m represents an integer of 0 to 2, and n represents an integer of 1 to 4.

Examples of the metal alkoxide include vinyl trimethoxy silane, vinyl triethoxy silane, vinyl tris-2-methoxyethoxy silane, vinyl triacetoxy silane, γ-glycidoxy propyl trimethoxy silane, γ-methacryloxy propyl trimethoxy silane, γ-aminopropyl triethoxy silane, γ-chloropropyl trimethoxy silane, γ-2-aminoethyl aminopropyl trimethyl silane, γ-mercaptopropyl trimethoxy silane, γ-ureidopropyl triethoxy silane, β-3,4-ethoxycyclohexyl ethyltrimethoxy silane, alkyl(phenyl)alkoxy silane, alkyl silicate, tetrapropoxy titanium, tetrabutoxy titanium, dibutoxy titanium-bis(octylene glycolato), dipropoxy titanium-bis(ethylacetyl acetaro), diproproxy titanium-bis-(triethanolaminato), zirconium dipropoxydiacetyl acetonato, tributoxy zirconium acetyl acetonato, tetraalkoxy zirconium, aluminum isopropylato, aluminum diisopropoxy monoethyl acetato, aluminum-n-butoxide monomethyl acetato, aluminum diisobutoxy monomethyl acetato and aluminum di-n-butoxy monoethyl acetoacetato.

The organic acid metal salt is preferably metal acetyl acetonato, and more preferably zirconium acetyl acetonato. The preferable zirconium acetyl acetonato is zirconium tetrakis acetylacetonato, zirconium dibutoxybisacetylacetonato, zirconium tributoxyacetylacetonato, zirconium trifluoroacetylacetonato.

The elements of the organic metal compounds constituting a light-emitting layer include Ca, W, Ba, Si, Zn, Cd, P, Sr, Mg, As, Ge, Y, V, Ga, Pb, Mn, Ti, Sn, Eu, Er, Sm, Tm, Tb, Dy, Al, Nd, Ce, Bi, Fe, S, Ag, Cu, F, Cl, Br, I, Hf, Tl, B, Na, Be, K, In, Pt, Ru, Ir, Pd, Rh, Co. and Ni.

The elements of the organic metal compounds constituting an insulating layer include Ca, W, Ba, Si, Sr, Mg, Y, V, Ga, Pb, La, Zr, Mn, Ti, Al, Ta, and Bi.

The organic metal compounds used for forming a light-emitting layer and an insulating layer are mixed with a solvent to form a paste or a sol solution. To form a sol, water and alcohol-solvent are mainly used.

Thickeners which can be added to a paste or a sol solution include cellulose compounds, such as nitrocellulose and carboxymethyl cellulose; general-purpose polymers, such as polyethylene, polystyrene, polypropylene, polymethyl methacrylate, polyethyl methacrylate, and polycarbonate; and natural high-molecular compounds, such as resins and asphalt. The thickener is preferably added in an amount up to about 30% by weight and more preferably 0.1 to 15% by weight based on a total amount of paste or sol solution.

Film-forming properties-improving agents which can be added to a paste or a sol solution include fatty acids, such as stearic acid, arachidic acid, linoleic acid, and linolenic acid; phthalic esters, such as dibutyl phthalate and dioctyl phthalate; aliphatic dibasic acid esters, such as dioctyl adipate, diisodecyl adipate, dibutyl sebacate, and dioctyl sebacate; fatty acid esters, such as dibutyl oleate, methyl acetyl ricinoleate and butyl stearate; and phosphoric esters, such as tricresyl phosphate, trioctyl phosphate, triphenyl phosphate, and trichloroethyl phosphate. The film-forming properties-improving agent is preferably added in an amount up to about 50% by weight and more preferably 0.1 to 30% by weight based on a total amount of paste or solution.

The sol solution may further contain an organic acid for prevention of gelation, such as acetic acid or trifluoroacetic acid, preferably in an amount up to about 30% by weight and more preferably 0.1 to 15% by weight based on a total amount of paste or sol solution.

The solvent for dissolving the organic metal compounds includes aliphatic hydrocarbons, such as octane, decane and tridecane; aromatic hydrocarbons, such as toluene and xylene; halogenated hydrocarbons, such as methylene chloride and chlorobenzene; alcohols, such as ethanol, butanol, α-terpineol, and ethylene glycol; ketones, such as acetone, methyl ethyl ketone, and cyclohexanone; ethers, such as diethyl ether and tetrahydrofuran; and esters, such as ethyl acetate and benzyl acetate. The paste or sol solution preferably has a solid content of from 5 to 50% by weight.

The substrate which can be used in the EL element of the present invention includes an inorganic substrate made of soda-lime glass, borosilicate glass, alkali-free glass, quartz glass, PLZT, PZT, $BaTiO_3$, MgO, Si, GaAs, etc.; and heat-resistant resin substrate made of polyimide, polyphenylene sulfide, polyamide, etc. Of them, quartz glass is preferred.

The paste or the sol solution is applied to an insulating layer by bar coating, spin coating, spray coating, dip coating, roll coating, screen printing, and the like.

The coating layer is heated in an electric oven, such as muffle furnace, a belt furnace, and an infrared heating oven. The heating temperature is above the thermal decomposition temperature of the paste components or the sol solution components, i.e., the organic metal compounds, additives, and the solvent. In order to conduct thermal decomposition completely and to stabilize the oxidized state of the film, the coating layer is preferably calcined at a temperature of from 350° to 1500° C., preferably from 600° to 1000° C., for a period of from 30 minutes to about 10 hours, preferably from 30 minutes to 3 hours. At too low a heating temperature, thermal decomposition tends to be insufficient for progress of crystallization, resulting in reduction in emission efficiency. At too high a heating temperature, the organic metal compounds tend to react with the substrate to undergo a change of composition ratio, also resulting in reduction in emission efficiency. Heating over more than 10 hours gives no adverse influence but is not particularly needed. The heating may be effected in an oxidizing atmosphere, such as air or oxygen, or an inert atmosphere, such as nitrogen or argon, either under atmospheric pressure or under reduced pressure.

The film thickness depends on the viscosity of the paste or the sol solution applied and the method of application. However, if it is too large, the film is apt to suffer from such defects as cracks. The thickness of a film formed by a single coating step followed by heating is preferably from about 0.01 to 1 μm. Where a larger thickness is desired, the sol solution may be applied and heated repeatedly.

After heating, the film may be subjected to a heat treatment (annealing) for further improvement in crystallinity and surface smoothness of the film and reduction of defects. Thereby, driving voltage of the EL element can be reduced by 50 to 70%. The heat treatment is preferably carried out at about 400° to 1500° C., more preferably 800° to 1200° C. for about 30 minutes to 10 hours, more preferably 30 minutes to 3 hours. The annealing may be carried out successively after heating and after cooling.

The first electrode on the substrate includes that of Au, Pt, Cu, Ti, Al.

The insulating layer is preferably made of silicon nitride, silicon dioxide. The thickness thereof is preferably 0.1 to 100 μm.

The thickness of the light-emitting layer is preferably 0.01 to 10 μm, and more preferably 0.5 to 5 μm.

In the course of investigations into various combinations of oxide materials constituting a light-emitting layer and an insulating layer, it has been found that an EL element using $Zn_2SiO_4$:Mn as a light-emitting layer and $SiO_2$ as an insulating layer can be driven at a markedly lower voltage than a conventional one and also driven by a direct voltage. It has also been found that the EL luminance is greatly increased by subjecting the $Zn_2SiO_4$:Mn light-emitting layer to a heat treatment (annealing).

The TFEL element according to the present invention is chemically stable owing to the chemical stability of the oxide phosphor so that a protecting film, such as a passivation, is no more necessary, and extension of a working life is expected. According to the process of the present invention, a light-emitting layer with a strictly controlled composition can be formed with ease through simple operation of coating or printing followed by heating for crystallization. Therefore, an EL element having high luminance with little variation in thickness and composition can be prepared efficiently through simplified steps, thereby achieving great reductions in both process and cost.

The fluorescent film prepared by the wet process of the present invention may also serve as a high purity target of sputtering.

A full-color display can be obtained by laminating light-emitting layers emitting red light, green light or blue light in the same EL element or by placing red, green, and blue filters on a white light-emitting EL element according to the present invention.

The present invention will be illustrated in greater detail with reference to Examples, but it should be understood that the present invention is not deemed to be limited thereto. All the percents are by weight unless otherwise indicated.

EXAMPLE 1

A paste composition for forming an $Zn_2SiO_4$:Mn light-emitting layer was prepared from the following components. The paste was filtered through a Teflon (PTFE) filter having a pore size of 0.5 μm.

|  |  | Molar Ratio |
|---|---|---|
| Zinc 2-ethylhexanoate (Zn: 15%) | 1.66 g $(4.01 \times 10^{-3}$ mol) | 2 |
| Silicon resinate (a product of NE CHEMCAT; Si: 9.6 wt %) | 0.59 g $(2.01 \times 10^{-3}$ mol) | 1 |
| Manganese 2-ethylhexanoate | 0.056 g | 0.04 |

-continued

|  | Molar Ratio |
|---|---|
| (Mn: 8%) | $(8.09 \times 10^{-5}$ mol) |
| 10 wt % α-Terpineol solution of polybutyl methacrylate (hereinafter abbreviated as PBMA) | 1.60 g |
| Dioctyl phthalate | 2.30 g |
| Linoleic acid | 2.30 g |
| Trifluoroacetic acid | 1.15 g |

A quartz glass having thereon a transparent electrode of ITO (a solid solution of indium oxide and tin oxide) in stripes was prepared as a substrate. $Ta_2O_5$ was deposited on the substrate by sputtering to a thickness of 0.1 µm to form an insulating layer. The above-prepared paste composition was applied to the insulating layer by spin coating, calcined in the atmosphere at 800° C. for 1 hour in a muffle furnace, and then heat-treated at 900° C. for 3 hours to form an $Zn_2SiO_4$:Mn light-emitting layer having a thickness of 0.5 µm. On the light-emitting layer was formed the same insulating layer as described above. Finally, aluminum was deposited thereon by resistive heating to a thickness of 0.5 µm through a mask to form an electrode perpendicular to the ITO electrode to prepare a TFEL element having a double insulating layer structure.

With a square wave of 1 kHz/100 V applied between the crossing electrodes, the TFEL element exhibited green EL having the maximum emission luminance at an EL wavelength of 525 nm.

EXAMPLE 2

A sol solution for forming an $Zn_2SiO_4$:Mn light-emitting layer was prepared from the following components. The sol solution was stirred overnight and filtered through a PTFE filter having a pore size of 0.5 µm.

| $ZnCl_2$ | 0.65 g |
|---|---|
|  | $(4.80 \times 10^{-3}$ mol) |
| Tetraethoxysilane | 0.50 g |
|  | $(2.40 \times 10^{-3}$ mol) |
| $MnCl_2 \cdot 4H_2O$ | 0.023 g |
|  | $(3.63 \times 10^{-4}$ mol) |
| Ethanol | 2.54 g |
|  | $(5.52 \times 10^{-2}$ mol) |
| $H_2O$ | 0.27 g |
|  | $(1.51 \times 10^{-2}$ mol) |
| HCl (concentrated hydrochloric acid) | 0.13 g |
|  | $(1.30 \times 10^{-3}$ mol) |

A TFEL element was prepared in the same manner as in Example 1, except for using the above-prepared sol solution.

The film is drived with a square wave of 1 KHz/40 V. In a case of no heating of 900° C for 3 hours, driving voltage of 1 KHz/150 V was required.

With a square wave of 1 kHz/150 V applied between the crossing electrodes, the TFEL element emitted green light having the maximum emission luminance at an EL wavelength of 525 nm.

EXAMPLE 3

A paste for forming a $Y_2O_3$:Bi light-emitting layer was prepared from the following components. The sol solution was filtered through a PTFE filter having a pore size of 0.5 µm.

| Toluene solution of yttrium 2-ethylhexanoate (Y: 8%) | 1.75 g |
|---|---|
|  | $(1.57 \times 10^{-3}$ mol) |
| Bismuth resinate (a product of NE CHEMCAT; Bi: 21.8%) | 0.028 g |
|  | $(2.91 \times 10^{-5}$ mol) |

The paste was concentrated to a volume of about 63% in a drier to evaporate the low-boiling solvent, and to the concentrated solution were added the following additives.

| 10 wt % α-Terpineol solution of PBMA | 0.48 g |
|---|---|
| Dibutyl phthalate | 1.13 g |
| Linoleic acid | 1.13 g |
| α-Terpineol | 1.13 g |

In n-dodecane were dissolved 0.50 g of indium 2-ethylhexanoate and 0.046 g of tin 2-ethylhexanoate by thoroughly stirring to prepare a uniform solution. The solution was applied to a glass substrate (Corning 7059) by spin coating and calcined in the atmosphere at 800° C. for 30 minutes. The coating and calcination were repeated to form an ITO layer having a thickness of 0.2 µm and a surface resistivity of 90Ω. The ITO layer was photolithographically processed to form a transparent electrode in stripes. $SiO_2$ was deposited thereon by electron beam deposition to form an insulating layer having a thickness of 0.3 µm.

The resulting sol solution was applied to the insulating layer by spin coating and calcined in air at 600° C. for 1 hour to form a 0.5 µm thick light-emitting layer. An $SiO_2$ insulating layer was formed thereon in the same manner as described above. Finally, aluminum was deposited thereon by resistive heating to a thickness of 0.5 µm through a mask to form an electrode perpendicular to the ITO electrode to prepare a TFEL element having a double insulating layer structure.

With a square wave of 1 kHz/200 V applied between the crossing electrodes, the TFEL element exhibited bluish white EL between a wavelength of 450 nm to 650 nm.

EXAMPLES 4 TO 11

A paste composition for forming $Y_2O_3$:Al was prepared in the same manner as in Example 3, except for substituting bismuth resinate with aluminum triisopropoxide. In the same way, by substituting bismuth resinate with gallium triisopropoxide, tris(pivaloyltrifluoroacetonato)europium, dysprosium triisopropoxide, trisacetylacetonatoerbium, trisacetylacetonatothulium, trisacetylacetonatoterbium or trisacetylacetonatocerium, paste compositions were prepared to form a light-emitting layer in examples 4 to 11.

A TFEL element was prepared in the same manner as in Example 3, except for using the above-prepared paste composition.

The emission characteristics of the resulting TFEL element with a square wave of 1 kHz/200 V applied between the crossing electrodes are shown in Table 1 below. The EL wavelength shown in Table 1 means the wavelength at which the emission luminance reached the maximum. Some elements, depending on the combination of a matrix and a luminescence center, show plural emission peaks.

TABLE 1

Emission Characteristics of TFEL Element

| Example No. | Matrix | Luminescence Center | EL Wavelength (nm) |
|---|---|---|---|
| 4 | $Y_2O_3$ | Al | 480 |
| 5 | $Y_2O_3$ | Ga | 475 |
| 6 | $Y_2O_3$ | Eu | 612 |
| 7 | $Y_2O_3$ | Dy | 485, 575 |
| 8 | $Y_2O_3$ | Er | 490, 560 |
| 9 | $Y_2O_3$ | Tm | 460, 590 |
| 10 | $Y_2O_3$ | Tb | 490, 540 |
| 11 | $Y_2O_3$ | Ce | 465 |

EXAMPLES 12 TO 35

A paste composition for forming a light-emitting layer was prepared in the same manner as in Examples 1, 2 or 3 using organic metal compounds selected to provide the matrix (an oxide crystal for EL) and the luminescence center shown in Table 2 below. A TFEL element was prepared using the paste composition in the same manner as in Examples 1, 2 or 3. The emission characteristics of the resulting TFEL element with a square wave of 1 kHz/200 V (or 300 V) applied between the crossing electrodes are shown in Table 2. The EL wavelength shown in the Table means the wavelength at which the emission luminance reached the maximum.

TABLE 2

Emission Characteristics of TFEL Element

| Example No. | Matrix | Luminescence Center | EL Wavelength (nm) |
|---|---|---|---|
| 12 | $VYO_4$ | Mn | 500–650 |
| 13 | $VYO_4$ | Bi | 480–680 |
| 14 | $SrV_2O_7$ | Mn | 450–680 |
| 15 | $SrV_2O_7$ | Bi | 450–680 |
| 16 | PLZT* | Eu | 618 |
| 17 | PLZT | Fe | 585 |
| 18 | $Y_2SiO_5$ | Tb | 545 |
| 19 | $Y_2SiO_5$ | Tm | 455, 580 |
| 20 | $Y_3Al_5O_{12}$ | Tb | 545 |
| 21 | $Y_3Al_5O_{12}$ | Tm | 460, 580 |
| 22 | $CaWO_4$ |  | 590 |
| 23 | $(La,Ca)MnO_3$ |  | 585 |
| 24 | $BaMgAl_{14}O_{23}$ | Eu | 465, 612 |
| 25 | $LaPO_4$ | Ce, Tb | 590 |
| 26 | ZnO |  | 450–650 |
| 27 | ZnO | Mn | 525 |
| 28 | $ZnGaO_4$ |  | 470 |
| 29 | $Al_2O_3$ |  | 465 |
| 30 | $SiO_2$ | Tm | 465, 585 |
| 31 | $SiO_2$ | Eu | 612 |
| 32 | MgO | Mn | 475 |
| 33 | CaO | Mn | 475, 580 |
| 34 | SrO | Mn | 590 |
| 35 | BaO | Mn | 475, 590 |

Note: *$Pb_{1-x}La_x(Zr_yTi_{1-y})_{1-x/4}$ (x = 9; y = 65)

EXAMPLE 36

A paste composition for forming an insulating layer was prepared from the following components. The paste composition was filtered through a PTFE filter having a pore size of 0.5 μm.

| Silicon resinate (a product of NE; Si: 9.6%) | 1.89 g |
|---|---|
| 10 wt % α-Terpineol solution of PBMA | 1.26 g |
| Dioctyl phthalate | 1.89 g |
| Linoleic acid | 1.89 g |
| α-Terpineol | 1.89 g |

The paste composition was applied by spin coating to a quartz glass substrate having thereon an ITO electrode in stripes, and calcined in the atmosphere at 800° C. for 30 minutes to form a 0.3 μm thick insulating layer.

A TFEL element was prepared in the same manner as in Example 1, except for using the above-prepared insulating layer.

When a square wave of 1 kHz was applied between the crossing electrodes of the resulting TFEL element, green EL was observed from about 40 V and, at a voltage of about 100 V the luminance became higher than that obtained with the TFEL element of Example 1. The change in luminance with reduction of driving frequency was small. It was confirmed that the element also starts to emitt at 30 V showing EL emission by DC voltage.

EXAMPLE 37

A sol solution for forming an insulating layer was prepared from the following components. The sol solution was filtered through a PTFE filter having a pore size of 0.5 μm.

| Tetraethoxysilane | 1.02 g |
|---|---|
| Ethanol | 5.17 g |
| $H_2O$ | 0.59 g |
| HCl (concentrated hydrochloric acid) | 0.27 g |

The sol solution was applied by spin coating to a quartz glass substrate having thereon an ITO electrode in stripes, and calcined in the atmosphere at 800° C. for 30 minutes. The coating and calcination were repeated to form a 0.3 μm thick insulating layer.

A TFEL element was prepared in the same manner as in Example 1, except for using the above-prepared laminate structure.

The resulting TFEL element exhibited substantially the same emission characteristics as the EL element of Example 36.

EXAMPLE 38

The paste composition as prepared in Example 1 was applied to a quartz substrate by spin coating and calcined in the atmosphere at 800° C. for 1 hour. The coating and calcination were repeated to form a 10 μm thick light-emitting layer. The light-emitting layer was subjected to a heat treatment at 1000° C. for 3 hours to prepare a target for sputtering.

A TFEL element was prepared in the same manner as in Example 1, except for forming the light-emitting layer by sputtering using the above-prepared target.

The resulting TFEL element exhibited the same emission characteristics as observed in Example 1.

EXAMPLE 39

A light-emitting layer was formed in the same manner as in Example 4, except for using the paste composition prepared in Example 6 and photolithographically processed to form a light-emitting layer in stripes. The same process was repeated successively by using the sol solutions prepared in Examples 9 and 10 to form a three-layered light-emitting layer. A TFEL element was prepared in the same manner as in Example 4, except for using the thus obtained light-emitting layer.

The resulting TFEL element emitted red, blue and green light with an alternating electrical field applied between the crossing electrodes, and was capable of full-color displaying by combining these luminescence colors.

EXAMPLE 40

A TFEL element was prepared in the same manner as in Example 3. Red, blue, and green color filters were provided on the uppermost layer of the element to obtain an EL element emitting light of the color corresponding to the color filters. Combination of these luminescence colors provided a TFEL element capable of full-color displaying.

According to the process of the present invention, each layer constituting a TFEL element can be formed without using a high vacuum system. This leads to great reductions in cost and steps involved. Further, use of oxide materials, which are essentially chemically stable, in the light-emitting layer and the insulating layer provides a TFEL element which can be driven stably at a reduced driving voltage for a prolonged period of time. Furthermore, the crystal properties of the light-emitting layer can be improved by using the raw materials at a stoichiometrically stable composition ratio and/or subjecting the light-emitting layer to a heat treatment, thereby obtaining high luminance from oxide materials which have conventionally exhibited low luminance. Moreover, according to the present invention, a proper combination of a light-emitting layer and an insulating layer makes it possible to provide such an EL element structure unknown to the art that can be driven at a low voltage by a DC drive while using oxide phosphors.

While the present invention is characterized in that a TFEL element is produced by a process consisting of applying a sol solution and heating the coating layer, the same process also applies to preparation of a target for sputtering. By this process, a sputter target having a high purity can be obtained at a low cost. The sputter target obtained is more stable in stoichiometry than those prepared from powdered carbonates or oxalates. Use of the thus prepared sputter target in formation of a light-emitting layer of a TFEL element, though somewhat inferior in process simplicity, makes it possible to form a highly crystalline, i.e., orientation-controlled light-emitting layer containing little impurity at a low temperature thereby providing a high performance TFEL element.

While the invention has been described in detail and with reference to specific examples thereof, it will be apparent to one skilled in the art that various changes and modifications can be made therein without departing from the spirit and scope thereof.

What is claimed is:

1. An electroluminescence element composed of a substrate, a first electrode, a first insulating layer, a light-emitting layer, a second insulating layer, and a second electrode in this order, wherein said light-emitting layer comprises an oxide material containing a plurality of elements which is obtained by applying a coating of a solution of organic metal compounds, said organic metal compounds containing an element acting as a luminescence center, and heating the coating, the composition ratio of the elements constituting said oxide material being substantially equal to the ratio among the same elements present in the materials used to form the oxide material, wherein said oxide material forms a matrix for the element acting as a luminescence center.

2. An electroluminescence element as claimed in claim 1, wherein said oxide material is $Zn_2SiO_4$:Mn.

3. An electroluminescence element as claimed in claim 1, wherein said first insulating layer and said second insulating layer comprise $SiO_2$.

4. A process for producing an electroluminescence element comprising the step of dissolving a compound of an element acting as a luminescence center and one or more of organic metal compounds having different metallic elements in a solvent to prepare a hydrolyzable sol solution having a prescribed composition ratio of the metallic elements, the step of applying said sol solution to a first insulating layer of a substrate having formed thereon a first electrode and a first insulating layer in this order to form a coating layer, the step of heating said coating layer to form an oxide film of a light-emitting layer having a composition ratio of metallic elements substantially equal to that of the sol solution, and the step of successively forming a second insulating layer and a second electrode on said oxide film.

5. A process as claimed in claim 4, wherein said composition ratio of the metallic elements of said sol solution is a stoichiometric composition ratio.

6. A process as claimed in claim 4, wherein the process further comprises the step of subjecting said oxide film to a heat treatment.

7. A process as claimed in claim 4, wherein said first and second insulating layers are formed by a wet process.

* * * * *